Nov. 18, 1941.　　　　E. CHALLET　　　2,263,350
ELECTRIC HEATING PLATE
Filed April 3, 1937
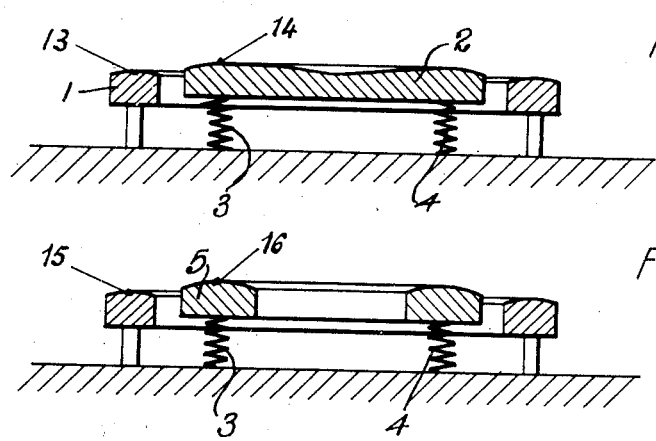
INVENTOR
Etienne Challet
BY
ATTORNEY Patented Nov. 18, 1941

2,263,350

UNITED STATES PATENT OFFICE 2,263,350

ELECTRIC HEATING PLATE

Etienne Challet, Paris, France, assignor of one-fourth to Entreprises Electriques Fribourgeoises, Fribourg, Switzerland, a company of Switzerland Application April 3, 1937, Serial No. 134,885
In Switzerland January 13, 1937

3 Claims. (Cl. 219—37)

The invention relates to electric heating plates and has for its object the provision of a heating plate consisting of two or more parts, the levels of which can be changed in respect to each other. Such change takes place automatically when a receptacle is placed on the plate; when the bottom of the receptacle is concave, the center part of the plate will assume a position higher than any other part of the plate, and when the bottom of the receptacle is convex, the center part of the plate will assume a converse position. In each case, the other parts of the surface of the plate are at graduated levels.

The way of constructing such a plate is to provide for the outer part of the plate in annular shape and fixed position, while the other parts are fixed on resilient supports, e. g. coil springs; the shape of the center part is either circular or annular.

The upper surface of the parts of the plate has annular elevations as shown in applicant's copending application Serial No. 133,708; in that embodiment, a more intimate contact between plate and receptacle is obtained. To insure the optimum heat transfer from an annular heating coil (not shown) enclosed within the surface part, an elevation is advantageously lodged along a line corresponding to a concentric annular line dividing the surface area into two areas of equal size.

In the drawing, Fig. 1 shows the cross-section of an elevation of a plate with concavely curved surface, the uppermost portion of the cross-sectional curve defining an annular elevation along the theoretical line of greatest heat concentration, the center part mounted on resilient coils and having the form of a disk.

Fig. 2 shows the cross-section of an elevation of a plate as shown in Fig. 1, the center part being of annular shape, however.

The plate illustrated in Fig. 1 consists of two parts, a fixed outer part of annular shape 1 and a disk-shaped center part 2 supported by a plurality of coils 3 and 4. When no receptacle is placed on the plate, the center part will assume a level slightly higher than that of the outer part, corresponding to the position it will assume when a receptacle with a concave bottom is placed on the plate. If the bottom of the receptacle is convex, the coils 3 and 4 are compressed and the center part 2 assumes a position lower than outer part 1. The annular elevations are denoted by 13 and 14.

In Fig. 2 the center part 5 mounted on coils 3 and 4 is of annular shape. The annular elevations are denoted by 15 and 16.

Having thus described my invention, I claim:

1. An electric heating plate comprising a plurality of concentrically arranged heating surface parts, the top of each of said parts having an annular elevation, said elevation defining the apex of a moderately convexly curved cross-section through said top, and means for supporting said parts, said supporting means comprising a plurality of resilient supports for automatic adjustment of said parts to the shape of the bottom of a receptacle placed on the heating plate and in response to the weight of said receptacle.

2. An electric heating plate according to claim 1, wherein the heating surface part nearest the center of the plate has the shape of a disk.

3. An electric heating plate according to claim 1, wherein the heating surface part nearest the center of the plate is annular.

ETIENNE CHALLET.